(12) United States Patent
Shamsee et al.

(10) Patent No.: US 9,116,736 B2
(45) Date of Patent: Aug. 25, 2015

(54) VIRTUALIZED MOVEMENT OF ENHANCED NETWORK SERVICES ASSOCIATED WITH A VIRTUAL MACHINE

(75) Inventors: Navaid Shamsee, Dubai (AE); Salvatore Tarallo, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 307 days.

(21) Appl. No.: 13/437,849

(22) Filed: Apr. 2, 2012

(65) Prior Publication Data

US 2013/0263125 A1    Oct. 3, 2013

(51) Int. Cl.
*G06F 9/455* (2006.01)

(52) U.S. Cl.
CPC .................. *G06F 9/45558* (2013.01)

(58) Field of Classification Search
CPC ...... H04L 49/70; H04L 49/00; G06F 9/45558
See application file for complete search history.

(56) References Cited

U.S. PATENT DOCUMENTS

| | | | | |
|---|---|---|---|---|
| 8,473,557 B2* | 6/2013 | Ramakrishnan et al. | ..... | 709/206 |
| 2010/0169507 A1* | 7/2010 | Sahita et al. | ................... | 709/250 |
| 2010/0169537 A1* | 7/2010 | Nelson | ................. | 711/6 |
| 2010/0214949 A1* | 8/2010 | Smith et al. | .................... | 370/254 |
| 2011/0131576 A1* | 6/2011 | Ikegaya et al. | ..................... | 718/1 |
| 2011/0255538 A1* | 10/2011 | Srinivasan et al. | ............ | 370/392 |
| 2011/0320556 A1 | 12/2011 | Reuther | | |

FOREIGN PATENT DOCUMENTS

EP    1962192 A1    8/2008

OTHER PUBLICATIONS

Cisco Whitepaper, [online], 2009, [retrieved on Dec. 16, 2011]. Retrieved from the Internet: <URL: http://www.cisco.com/en/US/solutions/collateral/ns340/ns517/ns224/ns836/white_paper_c11-557822.pdf>, pp. 1-17.
"VMWare VMotion," [online], 2009, [retrieved on Dec. 16, 2011]. Retrieved from the Internet: <URL: http://www.vmware.com/files/pdf/VMware-VMotion-DS-ES.pdf>, pp. 1-2.
VMWare Knowledge Base, "Enabling vMotion on internal vswitch behind bridged-mode firewalls and other network appliances," [online], Jan. 18, 2011, [retrieved on Dec. 16, 2011]. Retrieved from the Internet: <URL: http://kb.vmware.com/selfservice/microsites/search.do?cmd=displayKC&docType=kc&externalId=1006701&sliceId=1&docTypeID=DT_KB_1_1&dialogID=262446161&stateId=0%200%20262444871>, pp. 1-3.

(Continued)

*Primary Examiner* — Sisley Kim
(74) *Attorney, Agent, or Firm* — Leo R. Turkevich

(57) ABSTRACT

In one embodiment, a method comprises detecting an initiation of a movement process of a virtual machine executed by a first physical host to a destination physical host; initiating a transfer of a stateful process executed by a first network entity and providing enhanced network services for the virtual machine executed in the first physical host, including causing execution parameters for the enhanced network services to be sent to a second network entity; and completing the movement process of the virtual machine to the destination physical host in response to detecting the stateful process is executing in the second network entity and is ready to provide the enhanced network services for execution of the virtual machine in the destination physical host.

17 Claims, 5 Drawing Sheets

(56) References Cited

OTHER PUBLICATIONS

Wikipedia, "VMware ESX", [online] Dec. 18, 2011, [retrieved on Dec. 19, 2011]. Retrieved from the Internet: <URL: http://en.wikipedia.org/w/index.php?title=VMware_ESX&printable=yes>, pp. 1-9.

Wikipedia, "Hypervisor", [online] Dec. 14, 2011, [retrieved on Dec. 19, 2011]. Retrieved from the Internet: <URL: http://en.wikipedia.org/w/index.php?title=Hypervisor&printable=yes>, pp. 1-7.

* cited by examiner

VIRTUALIZED MOVEMENT OF ENHANCED NETWORK SERVICES ASSOCIATED WITH A VIRTUAL MACHINE

TECHNICAL FIELD

The present disclosure generally relates to virtualization technologies that enable a virtual machine to be moved dynamically from one physical server to another physical server.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Cloud computing enables network access to a shared pool of configurable resources that can be rapidly provisioned and released with minimum management effort. Cloud computing can be implemented based on one or more data centers implementing one or more physical computing machines known as "servers": the physical servers allocate compute and memory resources, under the control of a management agent, to form "virtual machines". The virtual machines can provide computing services under the control of the management agent. Virtualization technologies enable a virtual machine to be moved dynamically from one physical server to a destination physical server, where the destination physical server can be in the same data center or a different data center. The ability to move a virtual machine dynamically, however, introduces a number of challenges that necessitates the need for improved firewall protection for the movable virtual machine.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
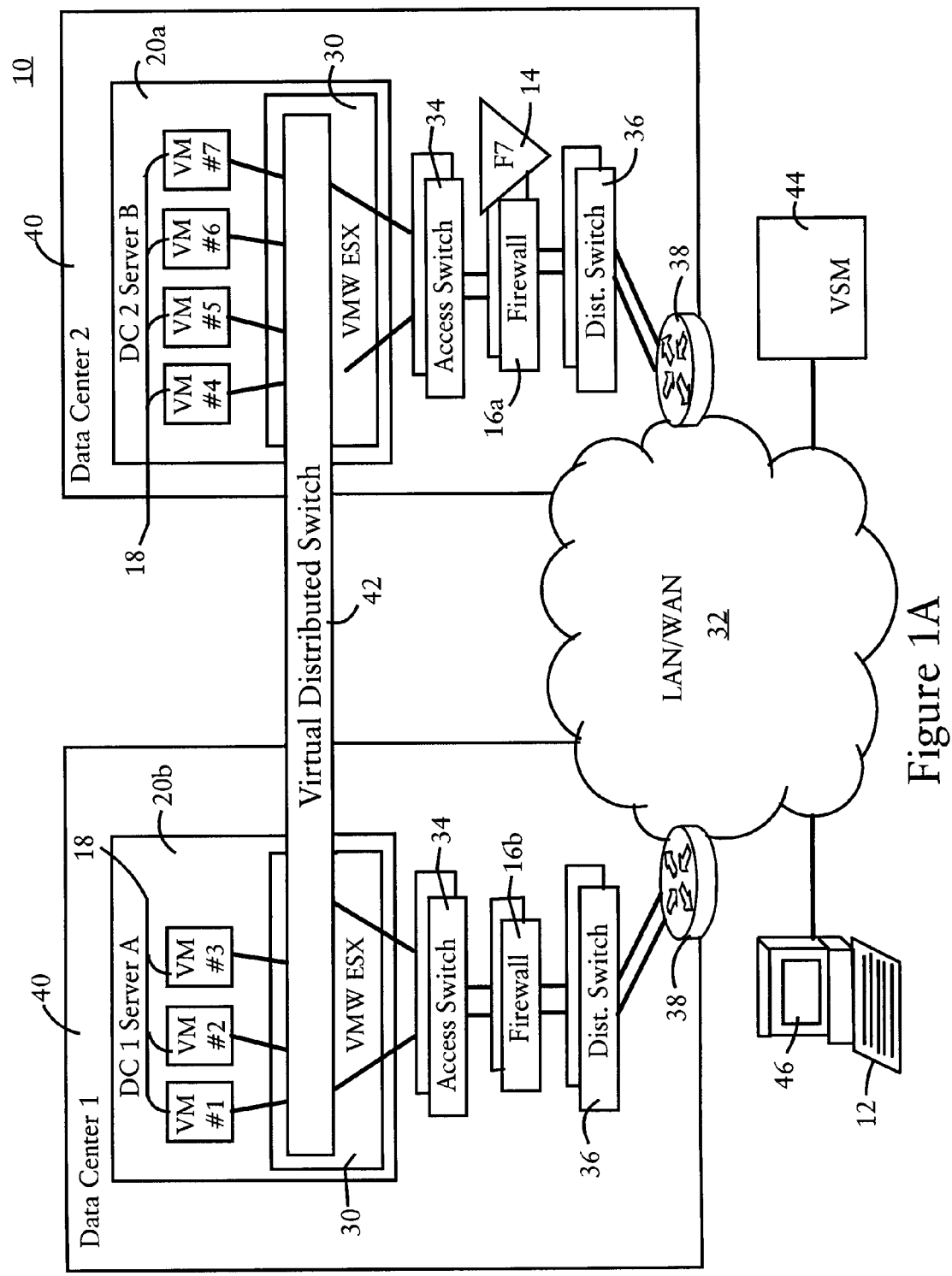
FIGS. 1A, 1B, and 1C illustrate an example system having an apparatus for moving a stateful process, for example a firewall process, from a first network entity to a second network entity during movement of a virtual machine from a first physical host to a second physical host, according to an example embodiment.

In one embodiment, a method comprises detecting an initiation of a movement process of a virtual machine executed by a first physical host to a destination physical host; initiating a transfer of a stateful process executed by a first network entity and providing enhanced network services for the virtual machine executed in the first physical host, including causing execution parameters for the enhanced network services to be sent to a second network entity; and completing the movement process of the virtual machine to the destination physical host in response to detecting the stateful process is executing in the second network entity and is ready to provide the enhanced network services for execution of the virtual machine in the destination physical host.

In another embodiment, an apparatus comprises a first circuit and a processor circuit. The first circuit is configured for detecting an initiation of a movement process of a virtual machine executed by a first physical host to a destination physical host. The processor circuit is configured for initiating a transfer of a stateful process executed by a first network entity and providing enhanced network services for the virtual machine executed in the first physical host. The processor circuit is configured for causing execution parameters for the enhanced network services to be sent to a second network entity. The processor circuit further is configured for completing the movement process of the virtual machine to the destination physical host in response to detecting the stateful process is executing in the second network entity and is ready to provide the enhanced network services for execution of the virtual machine in the destination physical host.

Detailed Description

Particular embodiments enable one or more virtual machines to be moved dynamically from one physical machine (also referred to as a "physical host") in a data center to a second physical machine, while maintaining firewall protection of the virtual machines before, during, and after the movement to the second physical machine. The particular embodiments enable the firewall protection to be dynamically transferred between physical machines providing firewall services (also referred to as "network entities"), even if the network entities are independent and distinct from the physical machines involved in the dynamic transfer of the virtual machines.

Conventional techniques for moving a virtual machine from a first physical host to a destination physical host encounter problems if the destination physical host is serviced by a different firewall device. For example, assume the first physical host (that executes the virtual machine before movement) is associated with a first firewall device that protects the first physical host, and the destination physical host (receiving the virtual machine during the movement) is protected by a second firewall device that is independent and distinct from the first firewall device, the first physical host, and the destination physical host; assume further that the virtual machine established a plurality of network connections (e.g., Transmission Control Protocol (TCP) connections) during execution within the first physical host, under the supervision of the first firewall device. The second firewall device associated with the destination physical host is not aware of the execution state of the virtual machine, and is therefore not aware of any of the network connections established within the first physical host. Hence, any network connections already established by the virtual machine during execution within the first physical host will be dropped by the second firewall device as soon as the virtual machine is transferred to the destination physical host.

Attempts to move the virtual machine by first disabling the firewall devices are inadequate because such attempts expose the virtual machine to attacks outside the data center. Attempts to execute the firewall process within the same hypervisor domain that controls and transfers the virtual machine also are inadequate because such virtualization of the firewall process within the same hypervisor domain as the virtual machine requires substantial computing resources; hence, virtualizing the firewall process within the same hypervisor domain as the virtual machine is not scalable, especially if optimization of the firewall process relies on application-specific integrated circuitry for executing at least part of the firewall process.

According to an example embodiment, a first firewall device (also referred to as a source network entity or a first network entity) executes a firewall service for a virtual machine, while the virtual machine is executed in the first physical host to provide virtualized services: the first firewall device transfers, to a destination firewall device, execution state variables associated with the firewall service concurrently with the transfer of the virtual machine from the first physical host to a second physical host. In other words, the first firewall device transfers the firewall state for the virtual machine to the destination firewall device. The destination firewall device, also referred to as the destination network entity, initiates the firewall service for the virtual machine moved into the second physical host prior to the activation of the virtual machine executed within the second physical host.

Hence, the example embodiments enable virtualized movement of enhanced network services associated with a virtual machine, without disabling the enhanced network services during movement of the virtual machine. Further, the virtualized movement can be implemented in a scalable manner without any disruption of the virtualized services provided by the virtual machine.

Figure 1B:
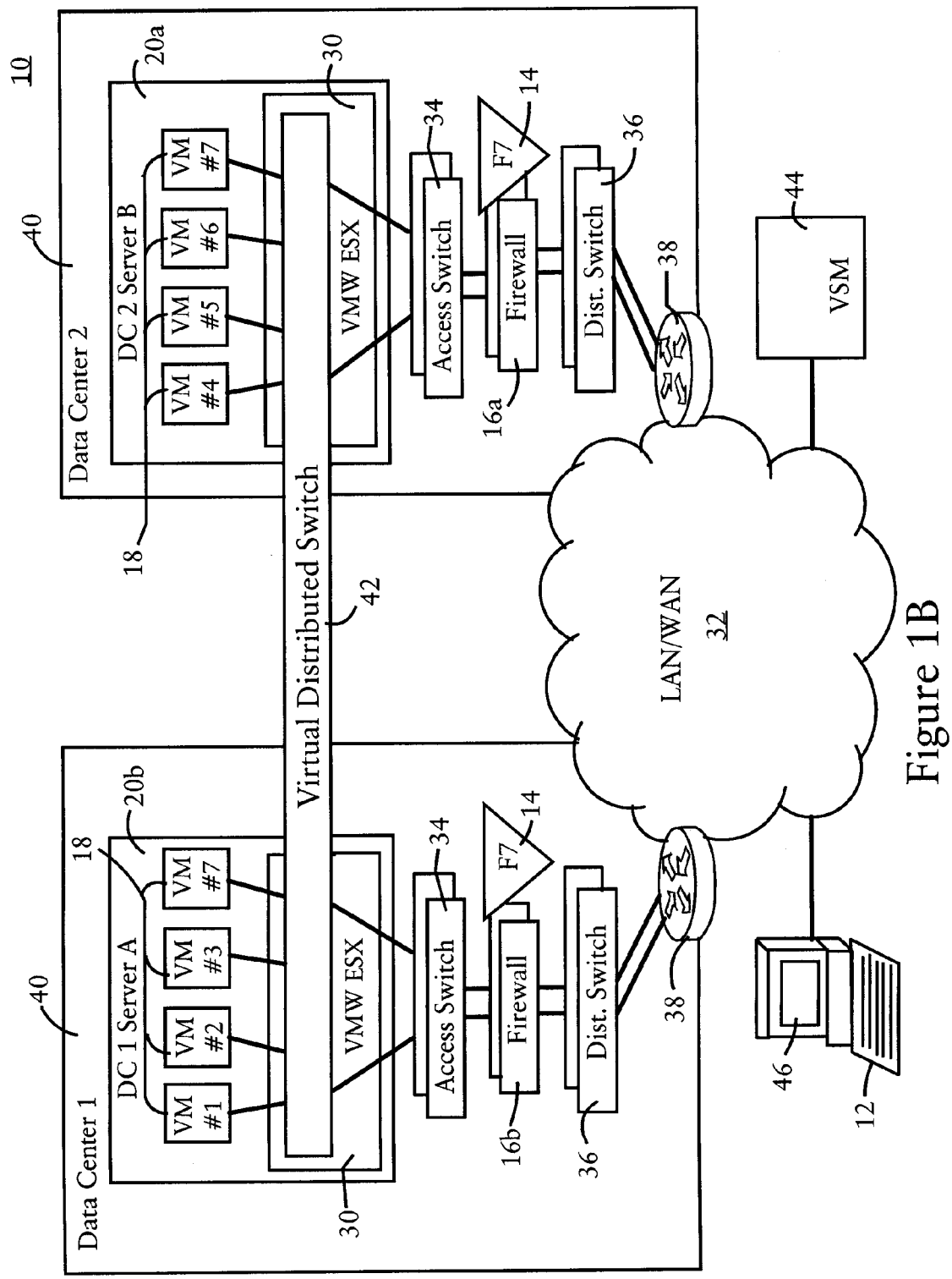
Figure 1C:
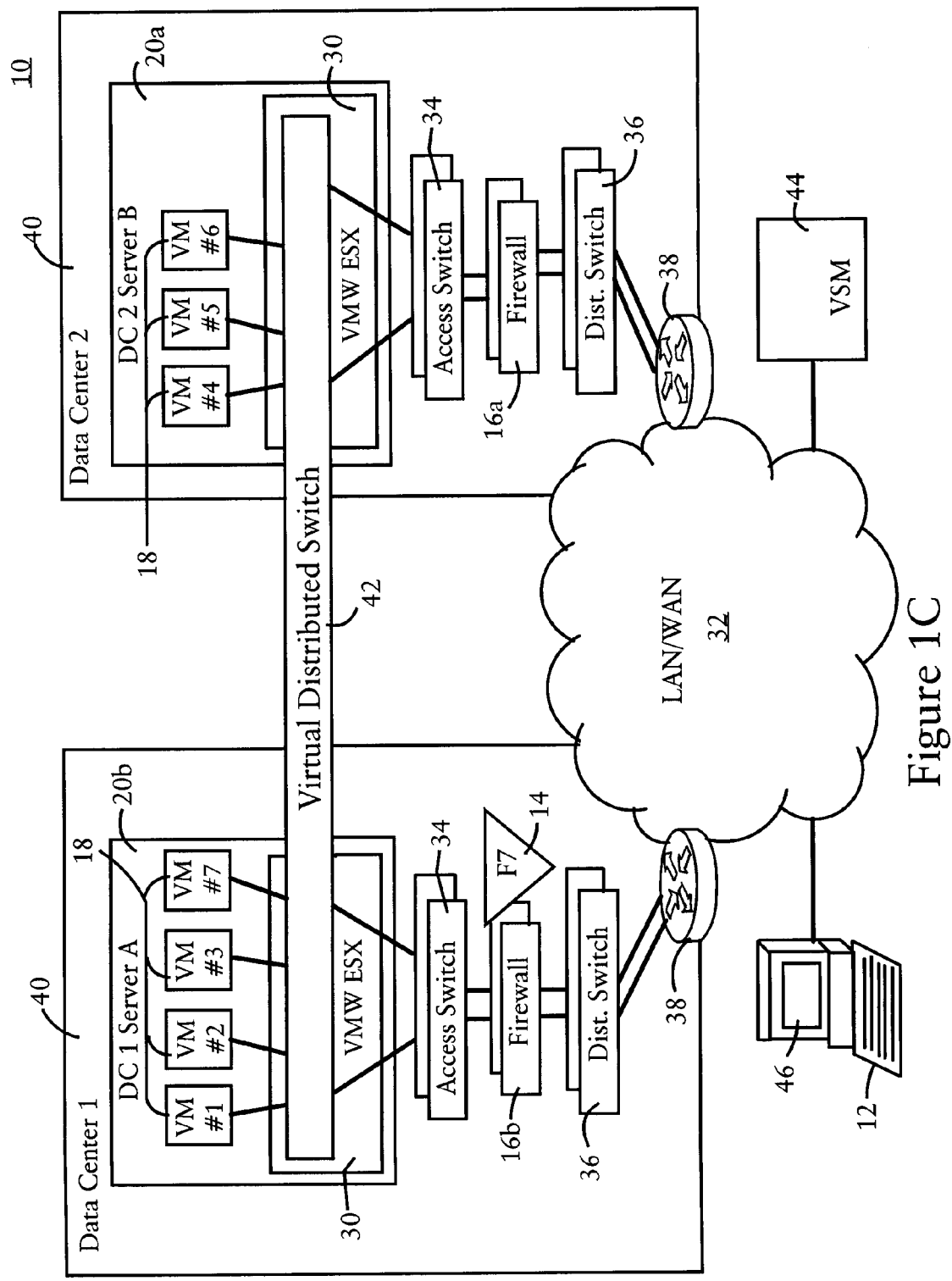

FIGS. 1A, 1B, and 1C illustrate an example system 10 having an apparatus 12 for moving a stateful process 14, for example a firewall process ("F7"), from a first network entity 16a to a second network entity 16b during movement of a virtual machine (VM) 18 (e.g., "VM #7") from a first physical host 20a to a second physical host 20b, according to an example embodiment.

FIG. 1A illustrates the example system 10 prior to movement of the virtual machine "VM #7" 18 from the first physical host 20a to the second physical host 20b, and prior to movement of the stateful process "F7" 14 from the first network entity 16a to the second network entity 16b. The first physical host 20a and the second physical host 20b each can be implemented as a multiprocessor-based server within a data center (DC) 40 offering virtualized services (e.g., cloud computing services) to users via an Internet protocol (IP)-based network 32, for example a local area network (LAN) and/or a wide area network (WAN).

Each of the virtual machines is executed in a physical host (e.g., 20a or 20b) under the control of a hypervisor 30. Each hypervisor 30 enables multiple virtual machines 18 to be executed concurrently on the corresponding physical host 20a or 20b. For example, the example virtual machines "VM #1", "VM #2", and "VM #3" 18 can be executed concurrently in the physical host 20b under the control of a hypervisor 30 executed by the physical host 20b; the example virtual machines "VM #4", "VM #5", "VM #6", and "VM #7" 18 can be executed concurrently in the first physical host 20a under the control of a hypervisor 30 executed by the first physical host 20a. Each virtual machine 18 can include its own operating system instance and one or more application instances providing virtualized services. An example hypervisor 30 is the commercially available VMware ESX Host that is commercially available from VMware, Inc., Palo Alto, Calif.

Each of the data centers also can include one or more access switches 34, one or more distribution switches 36, and one or more IP routers (or equivalent switches) 38 connecting the corresponding data center 40 to the IP network 32. An example of the access switches 34 can include the commercially available Cisco Catalyst 6500 Series Switch from Cisco Systems, San Jose, Calif. An example distribution switch 36 can include the commercially available Cisco Catalyst 6500 Series Switch from Cisco Systems. Hence, the Cisco Catalyst 6500 Series Switch can implement the operations associated with the access switch 34 and/or the distribution switch 36.

As illustrated in FIGS. 1A, 1B, and 1C, the first physical host 20a, the destination physical host 20b, the first network entity 16a, and the second network entity 16b each are distinct and independent physical machines. The first network entity 16a is configured for providing enhanced network services (e.g., firewall protection) for any processes executed in the first physical host 20a, and the second network entity 16b is configured for providing enhanced network services for any processes executed in the physical host 20b. Hence, the illustrated firewall process "F7" 14 executed by the network entity 16a provides firewall services for the virtual machine "VM #7" 18 only during execution within the physical host 20a.

Hence, the first network entity 16a and the second network entity 16b are outside the management domains of the hypervisors 30 executed by the physical hosts 20a and 20b. Further, the first network entity 16a and the second network entity 16b each can include application-specific integrated circuitry (ASICs) for optimized execution of at least a part of the enhanced network services. Hence, the hypervisors 30 executed in the first and destination physical hosts 20a and 20b are distinct and independent from management interfaces executed in the first and second network entities 16a and 16b.

The access switches 34 can establish physical network connections for a virtual distributed switch 42 under the control of a virtual switch manager (VSM) 44. The virtual distributed switch 42 and the virtual switch manager 44 can be implemented, for example, using the commercially available Cisco Nexus 1000V Series Virtual Switch Module from Cisco Systems.

The virtual distributed switch 42 enables the virtual machine "VM #7" 18 to be moved from the first physical host 20a to the destination physical host 20b, under the control of a management entity 46 executed by the apparatus 12, and via the physical data links (layer 2) established between the distribution switches 36 and routers 38 via the network 32: network connections (layer 3) also may be established between the distributed switches 36. In one embodiment, the network 32 can be implemented as a local area network providing a data center interconnect between the data centers 40 within the same geographic location (e.g., a building or an office campus); in another embodiment, the network 32 can be implemented as a wide area network (e.g., the Internet) that connects the data centers 40 separated by several hundred miles, or thousands of miles.

Figure 2:
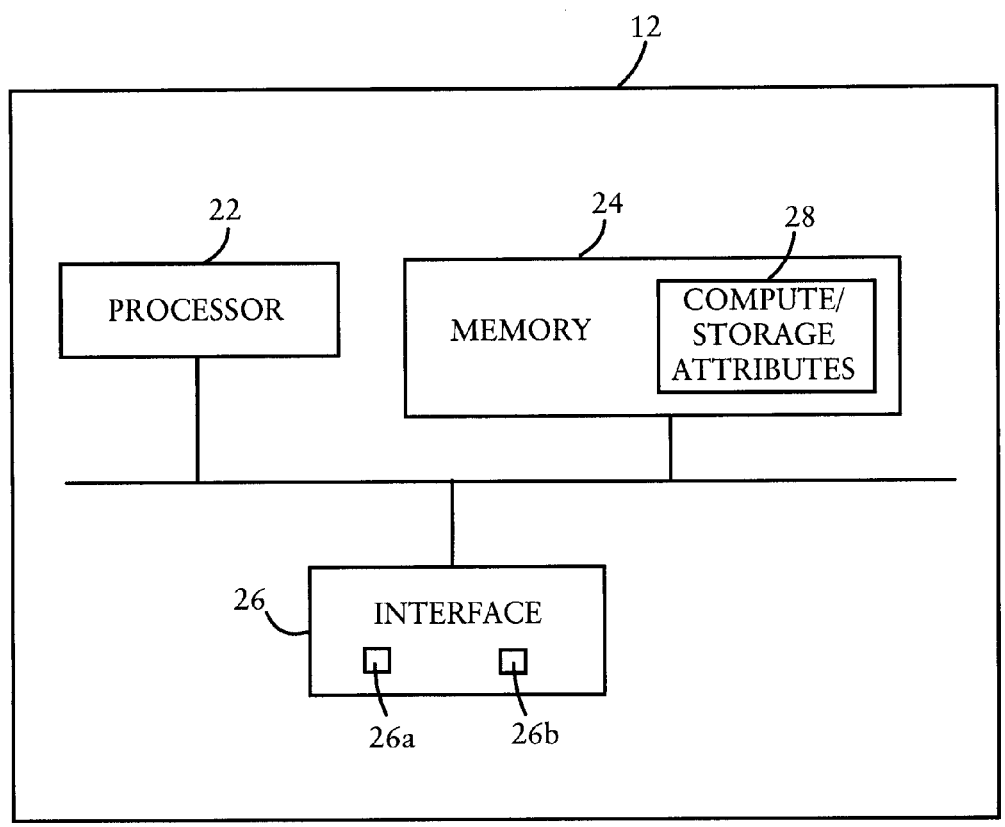
FIG. 2 illustrates an example apparatus for transferring the stateful process to the second network entity of FIG. 1, and completing the movement process of the virtual machine to the destination host, according to an example embodiment.

FIG. 2 illustrates an example apparatus 12 for transferring the stateful process "F7" 14 to the second network entity 16b, and completing the movement process of the virtual machine "VM #7" 18 to the destination physical host 20b, according to an example embodiment. The apparatus 12, implemented as a physical machine (also referred to as a "physical host") such as a host user computer, can include a processor circuit 22, a memory circuit 24, and an interface circuit 26. The processor circuit 22 can be configured for executing the management entity 46 based on management user inputs received via the interface circuit 26. The interface circuit 26 can include a user interface circuit 26a configured for receiving user inputs from a management user via an attached keyboard, pointing device (e.g., mouse or touchpad), etc. The interface circuit 26 also can include a network interface circuit 26b (e.g., a wired or wireless network interface card) configured for sending and receiving wired or wireless data packets according to a prescribed data protocol (e.g., wired or wireless Ethernet/IEEE 802).

As described below, the user interface circuit 26a and/or the network interface circuit 26b can be configured for receiving and detecting a request from the management user for initiation of the movement process of the virtual machine "VM #7 " 18 and/or the stateful process "F7" 14. The management entity 46 can be configured for interpreting the request from the management user, and in response sending notifications to the hypervisors 30 to begin the movement process of the virtual machine "VM #7 " 18 to the destination physical host 20b; the management entity 46 also can concurrently send notifications to the management interfaces executed in each of the network entities 16a and 16b to initiate transfer of the stateful process "F7" 14 to the second network entity 16b. An example of the management entity 46 can include the commercially available VMware VMotion from VMWare, modified as described herein. For example the commercially available VMotion can be modified to include an executable resource (e.g., a "plug-in") that enables the VMotion to communicate and interact with the management interfaces executed in the network entities 16a and 16b.

As illustrated in FIG. 2, the apparatus 12 also can include a memory circuit 24 configured for storing compute/storage attributes 28, for example application state variables and data related to execution of the management entity 46.

In one embodiment, the enhanced network services provided by the stateful process "F7" 14 provide firewall protection of the virtual machine "VM #7 " 18. Each data center 40 can include one or more network entities (e.g., a firewall device) 16a, 16b, configured for providing enhanced network services (e.g., firewall services) to the virtual machines 18. Although only the stateful process "F7" 14 providing the firewall protection for the virtual machine "VM #7 " 18 is illustrated, it will be apparent that the network entities 16a and 16b each can provide independent and distinct stateful processes 14 for the virtual machines 18 executed in the corresponding associated physical hosts 20a and 20b. Although the enhanced network services are illustrated as firewall protection of the virtual machines 18, other enhanced network services can include encryption services, Virtual Private Network (VPN) services, etc. Each data center 40 can include a single firewall device 16a for servicing the entire data center, or a multiple firewall devices each configured for servicing a corresponding server cluster.

The management entity 46 executed by the processor circuit 22 can include logical management interfaces for controlling each of the hypervisors 30 executed by the physical hosts 20a and 20b. The management entity 46 also can include logical management interfaces (e.g., Application Programming Interfaces (APIs)) for communicating with the virtual switch manager 44, enabling network traffic destined for the virtual machine "VM #7 " 18 to be redirected from the first physical host 20a to the destination physical host 20b following migration of the virtual machine "VM #7 " 18, enabling the movement of the virtual machine "VM #7 " 18 (e.g., "VMotion") from the first physical host 20a to the destination physical host 20b via the virtual distributed switch 42.

The management entity 46 also can include logical management interfaces (e.g., APIs) for communicating with the management interfaces executed in each of the network entities 16a and 16b. Hence, the management entity 46 can copy a stateful process "F7" (as illustrated in FIG. 1A) to the network entity 16b as illustrated in FIG. 1B based on causing the copying to the network entity 16b of execution parameters used by the network entity 16a to provide the enhanced network services 14 to virtual machine "VM #7 " 18 in the first physical host 20a. Example execution parameters can include firewall rules and firewall states, for example identification of TCP connections opened by the virtual machine "VM #7 " 18 executed in the first physical host 20a, IP address(es) of the virtual machine "VM #7 " 18 executed in the first physical host 20a, IP addresses of clients in communication with the "VM #7 " 18, identification of the interface on which the firewall rules are to be applied, the firewall state table that is relevant to the virtual machine "VM #7 " 18 being moved, etc.

The management entity also can cause the first network entity 16a to remove the execution parameters that were used to execute the stateful process "F7" 14 for the firewall services while the virtual machine "VM #7 " 18 was executed in the first physical host 20a, enabling the stateful process to be released for other virtual machines 18 executed in the first physical host 20a, illustrated in FIG. 1C. The stateful process executed in the first network entity 16a need not necessarily be terminated and re-instantiated, rather a "soft reset" can be implemented based on deleting from the network entity 16a the execution parameters associated with execution of the virtual machine "VM #7 " 18 within the physical host 20a.

As described previously, FIG. 1A illustrates the example system 10 prior to movement of the virtual machine "VM #7 " 18 from the first physical host 20a to the second physical host 20b, and prior to movement of the stateful process "F7" 14 from the first network entity 16a to the second network entity 16b. FIG. 1B illustrates the transition of copying the virtual machine "VM #7 " 18 (for example, while in a paused state) to the second physical host 20b, and copying the stateful process "F7" 14 (for example, while in a paused state) to the second network entity 16b. FIG. 1C illustrates the completed movement of the virtual machine "VM #7 " 18 based on activation in the second physical host 20b, and the completed movement of the stateful process "F7" 14 based on activation in the second network entity 16b, and based on the termination in the first physical host 20a of the virtual machine "VM #7 " 18, and the termination in the first network entity 16a of the stateful process 14.

As described below with respect to FIG. 3, the management entity 46 executed by the processor circuit 22 in the apparatus 12 can detect initiation of a movement process of the virtual machine "VM #7 " 18 illustrated in FIG. 1A (e.g., in response to a user input via the user interface circuit 26a and/or the network interface circuit 26b), and in response initiate transfer of the stateful process (e.g., firewall process) "F7" 14 that provides the enhanced network services (e.g., firewall protection) for the virtual machine "VM #7 " 18. The management entity 46 also can ensure the stateful process "F7" 14 is executing in the second network entity 16b and is ready to provide the enhanced network services for the virtual machine "VM #7 " 18 executed in the destination physical host 20b (illustrated in FIG. 1B), before activating the virtual machine "VM #7 " 18 to provide virtualized services from the destination physical host 20b as illustrated in FIG. 1B. The management entity 46 also can send commands to the hypervisor 30 in the first physical host 20a to terminate the virtual machine "VM #7 " 18, and to the first network entity 16a to remove the execution parameters from the stateful process 14, illustrated in FIG. 1C.

Any of the disclosed circuits of the apparatus 12 (including the processor circuit 22, the memory circuit 24, the interface circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

Figure 3:
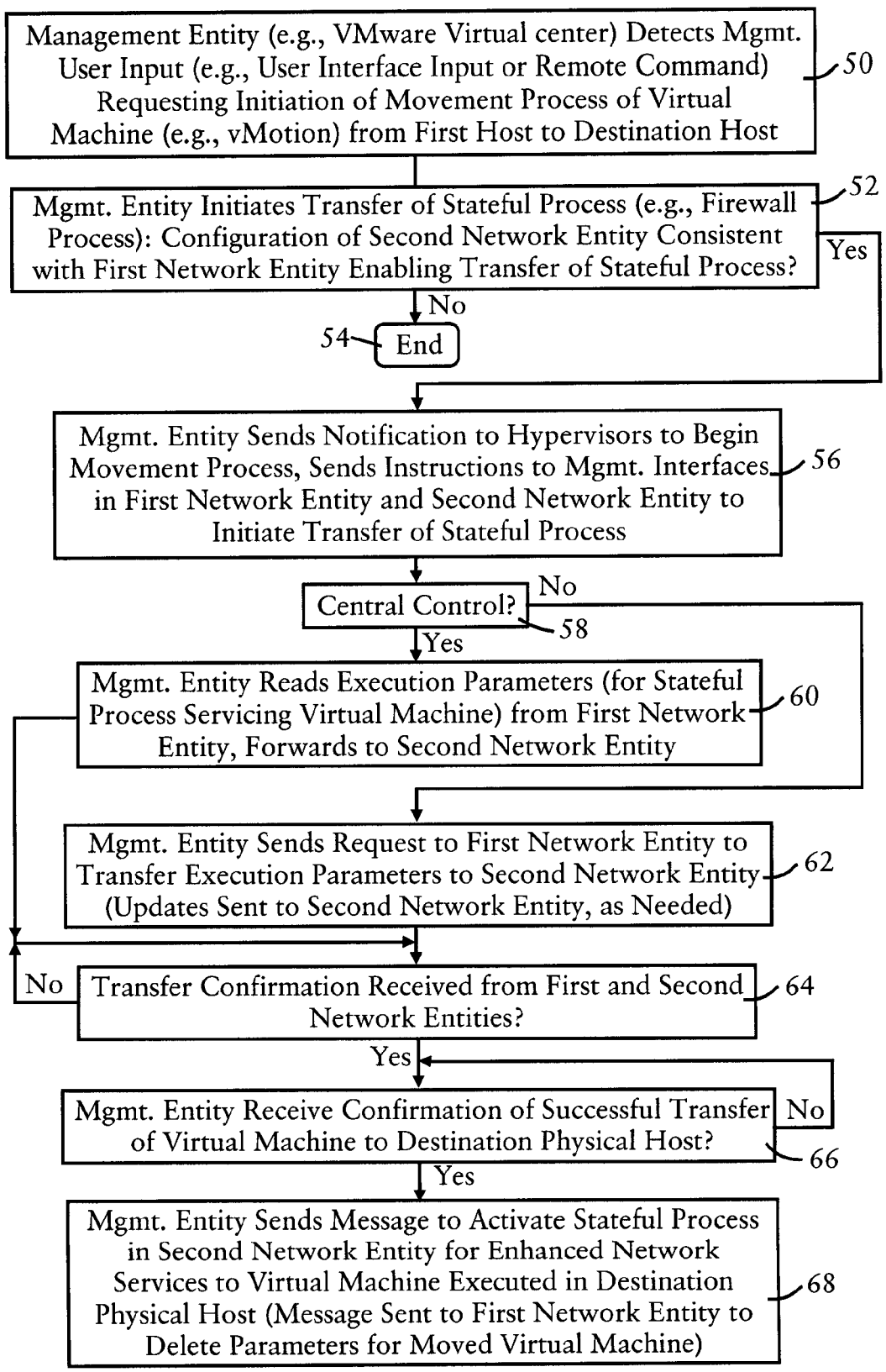
FIG. 3 illustrates an example method by the apparatus of FIG. 2 of transferring the stateful process to the second network entity, and moving the virtual machine to the destination host, according to an example embodiment.

FIG. 3 illustrates an example method by the apparatus 12 of transferring the stateful process "F7" 14 to the second network entity 16b, and moving the virtual machine "VM #7" 18 to the destination physical host 20b, according to an example embodiment. The steps described in FIG. 3 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

As illustrated in FIG. 3 with respect to the system 10 of FIG. 1A, the interface circuit 26 is configured for detecting in step 50 an initiation of a movement process, by a management user, of the virtual machine "VM #7" 18 executed by a first physical host 20a to a destination physical host 20b. The detecting of the initiation of the movement process can be based on the apparatus 12 receiving a management user request via the user interface 26a and/or the network interface circuit 26b for initiation of the movement process. Based on execution of the management entity 46, the processor circuit 22 detects the request from the management user requesting initiation of the movement process.

The management entity 46 executed by the processor circuit 22 initiates the transfer of the stateful process "F7" 14 in step 52 based on first determining whether the second network entity 16b is configured in a manner that is consistent with the first network entity 16a. In particular, the management entity 46 determines whether the second network entity 16b is able to execute the stateful process "F7" 14 in order to provide the enhanced network services (e.g., firewall protection) for the virtual machine "VM #7" 18 that is to be executed in the destination physical host 20b. For example, the management entity 46 can determine whether the second network entity 16b permits virtualized movement of firewall services, and/or whether the second network entity 16b includes compatible hardware and/or software resources permitting the transfer and execution of the stateful process "F7" 14 in addition to any other processes already executed by the second network entity 16b. Example hardware and/or software resource can include verifying the second network entity 16b has sufficient network interfaces, has sufficient security levels, etc. If the management entity 46 determines the configuration of the second network entity 16b inconsistent with the first network entity 16a in a manner that does not enable transfer of the stateful process "F7" 14, a warning is sent to the management user in step 54 and the transfer operation is terminated.

Assuming the management entity 46 determines the second network entity 16b has a configuration consistent with the first network entity 16a that permits transfer of the stateful process "F7" 14, the management entity 46 executed by the processor circuit 22 can send in step 56 a notification to the hypervisors 30 executed in each of the first physical host 20a and the destination physical host 20b to begin the movement process of moving the virtual machine "VM #7" 18 to the destination physical host 20b. The appropriate notification(s) also can be sent to the virtual switch manager 44 for management of network traffic associated with movement of the virtual machine "VM #7" 18.

The management entity 46 also can initiate in step 56 a transfer of the stateful process "F7" 14 from the first network entity 16a to the second network entity 16b. The management entity 46 can send instructions for initiating the transfer to management interfaces executed in each of the first network entity 16a and the second network entity 16b. For example, the management entity 46 can send instructions to the network entities 16a and 16b specifying the properties of the virtual machine "VM #7" 18 that is being moved, for example IP address(es), MAC address(es), VLAN properties, etc; the management entity 46 also can send properties of the source and destination physical hosts 20a and 20b, and/or properties of the source and destination network entities 16a and 16b.

The management entity 46 can cause execution parameters associated with the enhanced network services "F7" 14 to be sent to a second network entity 16b based on determining in step 58 whether control of enhanced network services are centralized. If in step 58 the management entity 46 determines that the control of enhanced network services are centralized, the management entity 46 can read in step 60 the execution parameters from the network entity 16*a* for the stateful process "F7" 14 protecting the virtual machine "VM #7 " 18 during execution in the first physical host 20*a*. For example, the management entity 46 can send a request to the management interface executed in the network entity 16*a* for the execution parameters associated with the stateful process "F7" 14; in response to the management entity 46 receiving the execution parameters from the network entity 16*a*, the management entity 46 can forward (e.g., write) in step 60 the execution parameters to the management interface executed in the destination network entity 16*b*.

Alternately, if in step 58 centralized control is not implemented in the management entity 46, the management entity 46 can send in step 62 a request to the first network entity 16*a* to transfer the execution parameters to the second network entity 16*b*.

In one embodiment of the network entities 16*a* and 16*b* implemented as firewall devices, the network entity 16*a* (also referred to as a source firewall device) can forward firewall rules and firewall states for the firewall process "F7" 14 using a common layer 2 network between the firewall devices 16*a* and 16*b*. For example, both the source firewall device 16*a* and the destination firewall device 16*b* can be configured with an interface on a virtual local area network (VLAN) that is extended between the two data centers 40 via the network 32. The source firewall device 16*a* can verify IP connectivity to the destination firewall device 16*b* using TCP or Internet Control Message Protocol (ICMP) keepalive probe messages. The source firewall device 16*a* can send a copy request for the stateful process "F7" 14 to the destination firewall devices 16*b*: in response to the source firewall device 16*a* receiving a copy acknowledgment from the destination firewall device 16*b*, the source firewall device 16*a* can send a copy data command to the destination firewall device 16*b*, where the copy data command includes the execution parameters for the stateful firewall process "F7" 14; the source firewall device 16*a* and the destination firewall device 16*b* can exchange copy and acknowledgment messages until copying of the execution parameters is complete. The processor circuit 22 can be configured for causing the first network entity 16*a* to send execution parameter updates in step 62 to the second network entity 16*b*, prior to completion of the movement process of the virtual machine "VM #7 " 18 to the destination physical host 20*b*.

A combination of steps 60 and 62 also can be employed to transfer the execution parameters for the stateful process "F7" 14 from the first network entity 16*a* to the second network entity 16*b*.

Various methods can be used to move the firewall rules from the source firewall device 16*a* to the destination firewall device 16*b*. In one embodiment, the firewall rules can be defined by the management entity 46, such that the firewall rules are maintained and supplied by the management entity 46 (as described with respect to step 60). The firewall policy for the stateful process "F7" 14 also can be parsed by the source firewall device 16*a*, such that all rules that apply to the virtual machine "VM #7 " 18 executed in the first physical host 20*a* (including host specific rules and broader rules for the supernet established for the data center "Data Center 2" 40) can be moved to the destination firewall device 16*b*. The firewall policy for the stateful process "F7" 14 also can be derived from broader firewall rules based on the relevant supernet protected by the firewall device 16*a*.

In another embodiment, the source firewall device 16*a* and the destination firewall device 16*b* can be configured with a layer 3 interface that is routable between the two data centers 40 via the IP network 32, enabling the firewall devices 16*a* and 16*b* to reside on different IP subnetworks communicating over a layer 3 network.

Each of the network entities 16*a* and 16*b* are configured for sending transfer notification messages to the management entity 46 upon completion of the copying of the execution parameters associated with the enhanced network services "F7" 14, enabling the concurrent instantiation of the enhanced network services "F7" 14 in a paused state, as illustrated in FIG. 1B. Hence, the apparatus 12 receives a notification each from the first network entity 16*a* and from the second network entity 16*b* that the execution parameters have been successfully transferred to the second network entity 16*b*. Hence, the processor circuit 22 executing the management entity 46 is configured for detecting in step 64, based on the notification messages from the network entities 16*a* and 16*b*, that the stateful process "F7" 14 is executing in the second network entity 16*b* and is ready to provide the enhanced network services for the virtual machine "VM #7 " 18 executed in the destination physical host 20*b*.

In response to detecting the notifications of step 64 (that the stateful process "F7" 14 is executing in the second network entity 16*b* and is ready to provide the enhanced network services for execution of the virtual machine "VM #7 " 18 in the destination physical host 20*b*), the management entity 46 executed by the processor circuit 22 is configured for completing in step 66 the movement process of the virtual machine "VM #7 " 18 to the destination physical host 20*b*. The processor circuit 22 is configured for detecting successful transfer of the virtual machine "VM #7 " 18 to the destination physical host 20*b*, for example based success messages from each of the source and destination hypervisors 30 (executed in the respective physical hosts 20*a* and 20*b*), illustrated in FIG. 1B. As described previously, each of the virtual machine "VM #7 " 18 and the firewall process "F7" 14 can be in a paused state during the transfer illustrated in FIG. 1B.

The management entity 46 is configured for responding to the detected successful transfer of the virtual machine "VM #7 " 18 by sending in step 68 a first notification to the second network entity 16*b* to activate the enhanced network services "F7" 14 for the virtual machine "VM #7 " 18 in the destination physical host 20*b*, and a second notification to the first network entity 16*a* to remove the execution parameters for the virtual machine "VM #7 " 18 from the stateful process "F7" 14. Once the enhanced network services "F7" 14 in the network entity 16*b* are activated, the management entity 46 can send instructions to the hypervisor 30 in the physical host 20*b* to activate the virtual machine "VM #7 " 18, and to the hypervisor 30 in the physical host 20*a* to terminate the virtual machine "VM #7 " 18, illustrated in FIG. 1C.

According to example embodiments, enhanced network services such as firewall services for a virtual machine can be dynamically transferred, ensuring the continued protection of the virtual machine during movement in a scalable manner.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting an initiation of a movement of a virtual machine executed by a first physical host to a destination physical host;
   initiating, in response to the detecting the initiation, a transfer of a stateful process executed by a first network entity and providing enhanced network services for the virtual machine executed in the first physical host, the execution of the stateful process being distinct from the movement of the virtual machine, the initiating including causing execution parameters for the enhanced network services to be sent to a second network entity, wherein the enhanced network services by the stateful process is for firewall protection of the virtual machine; and
   completing the movement of the virtual machine to the destination physical host in response to receiving a notification that the stateful process is executing in the second network entity and is ready to provide the enhanced network services for execution of the virtual machine in the destination physical host, wherein the first physical host, the destination physical host, the first network entity, and the second network entity each are distinct and independent physical machines, the first and second network entities outside any management domain of any hypervisor executed by the first or destination physical hosts.

2. The method of claim 1, wherein the causing of the execution parameters to be sent to the second network entity includes at least one of:
   reading the execution parameters from the first network entity and in response forwarding the execution parameters to be sent to the second network entity; or
   sending a request to the first network entity to transfer the execution parameters to the second network entity.

3. The method of claim 2, wherein the detection that the stateful process executing in the second network entity is ready to provide the enhanced network services is based on receiving a notification from the first network entity and from the second network entity that the execution parameters have been successfully transferred to the second network entity.

4. The method of claim 1, the first network entity and the second network entity each including application-specific integrated circuitry for executing at least a part of the enhanced network services.

5. The method of claim 1, wherein:
   the detecting includes detecting a user input to a management entity executed by a physical host, the user input requesting initiation of the movement of the virtual machine; and
   the initiating includes the management entity sending a first notification to hypervisors executed in each of the first physical host and the destination physical host to begin the movement of the virtual machine, and the management entity sending instructions for initiating the transfer to management interfaces executed in each of the first network entity and the second network entity, where the hypervisors executed in the first and destination physical hosts are distinct and independent from the management interfaces executed in the first and second network entities.

6. The method of claim 1, wherein the initiating is based on a management entity determining the second network entity is configured consistent with the first network entity, to permit the execution of the stateful process in the second network entity for providing the enhanced network services for the virtual machine executed in the destination physical host.

7. The method of claim 1, further comprising causing the first network entity to send execution parameter updates to the second network entity, prior to completion of the movement of the virtual machine executed in the first physical host to the destination physical host.

8. The method of claim 1, wherein the completing includes:
   detecting successful transfer of the virtual machine executed in the first physical host to the destination physical host; and
   responding to the detected successful transfer of the virtual machine by sending a first notification to the second network entity to activate the enhanced network services for the virtual machine in the destination physical host, and a second notification to the first network entity to remove the execution parameters for the virtual machine executed in the first physical host from the stateful process.

9. An apparatus comprising:
   a first circuit configured for detecting an initiation of a movement of a virtual machine executed by a first physical host to a destination physical host; and
   a processor circuit configured for initiating, in response to the first circuit detecting the initiation, a transfer of a stateful process executed by a first network entity and providing enhanced network services for the virtual machine executed in the first physical host, the execution of the stateful process being distinct from the movement of the virtual machine, the processor circuit configured for causing execution parameters for the enhanced network services to be sent to a second network entity, wherein the enhanced network services by the stateful process is for firewall protection of the virtual machine;
   the processor circuit further configured for completing the movement of the virtual machine to the destination physical host in response to receiving a notification that the stateful process is executing in the second network entity and is ready to provide the enhanced network services for execution of the virtual machine in the destination physical host, wherein the first physical host, the destination physical host, the first network entity, and the second network entity each are distinct and independent physical machines, the first and second network entities outside any management domain of any hypervisor executed by the first or destination physical hosts.

10. The apparatus of claim 9, wherein the processor circuit is configured for causing the execution parameters to be sent to the second network entity based on at least one of:
    reading the execution parameters from the first network entity and in response forwarding the execution parameters to be sent to the second network entity; or
    sending a request to the first network entity to transfer the execution parameters to the second network entity.

11. The apparatus of claim 10, wherein the processor circuit is configured for detecting that the stateful process executing in the second network entity is ready to provide the enhanced network services based on receiving a notification from the first network entity and from the second network entity that the execution parameters have been successfully transferred to the second network entity.

12. The apparatus of claim 9, the first network entity and the second network entity each including application-specific integrated circuitry for executing at least a part of the enhanced network services.

13. The apparatus of claim 9, wherein:
    the first circuit includes at least one of a user interface circuit or a network interface circuit configured for receiving a request from a management user for initiation of the movement of the virtual machine;

the processor circuit is configured for executing a management entity that detects the request from the management user, the user input requesting initiation of the movement of the virtual machine;

the management entity executed by the processor circuit configured for sending a first notification to hypervisors executed in each of the first physical host and the destination physical host to begin the movement of the virtual machine, and the management entity sending instructions for initiating the transfer to management interfaces executed in each of the first network entity and the second network entity, the hypervisors executed in the first and destination physical hosts distinct and independent from the management interfaces executed in the first and second network entities.

14. The apparatus of claim 9, wherein the initiating is based on a management entity executed by the processor circuit determining the second network entity is configured consistent with the first network entity, to permit the execution of the stateful process in the second network entity for providing the enhanced network services for the virtual machine executed in the destination physical host.

15. The apparatus of claim 9, wherein the processor circuit is configured for causing the first network entity to send execution parameter updates to the second network entity, prior to completion of the movement of the virtual machine executed in the first physical host to the destination physical host.

16. The apparatus of claim 9, wherein the completing includes:

detecting successful transfer of the virtual machine executed in the first physical host to the destination physical host; and responding to the detected successful transfer by sending a first notification to the second network entity to activate the enhanced network services for the virtual machine in the destination physical host, and a second notification to the first network entity to remove the execution parameters for the virtual machine executed in the first physical host from the stateful process.

17. Logic encoded in one or more non-transitory tangible media for execution and when executed operable for:

detecting an initiation of a movement of a virtual machine executed by a first physical host to a destination physical host;

initiating, in response to the detecting the initiation, a transfer of a stateful process executed by a first network entity and providing enhanced network services for the virtual machine executed in the first physical host, the execution of the stateful process being distinct from the movement of the virtual machine, the initiating including causing execution parameters for the enhanced network services to be sent to a second network entity, wherein the enhanced network services by the stateful process is for firewall protection of the virtual machine; and completing the movement of the virtual machine to the destination physical host in response to receiving a notification that the stateful process is executing in the second network entity and is ready to provide the enhanced network services for execution of the virtual machine in the destination physical host, wherein the first physical host, the destination physical host, the first network entity, and the second network entity each are distinct and independent physical machines, the first and second network entities outside any management domain of any hypervisor executed by the first or destination physical hosts.

* * * * *